(12) United States Patent
Spalink

(10) Patent No.: US 7,016,446 B1
(45) Date of Patent: Mar. 21, 2006

(54) CHANNEL DECODER FOR A DIGITAL BROADCAST RECEIVER

(75) Inventor: Gerd Spalink, Stuttgart (DE)

(73) Assignee: SONY International (Europe) GmbH, Berlin (DE)

( * ) Notice: Subject to any disclaimer, the term of this patent is extended or adjusted under 35 U.S.C. 154(b) by 1009 days.

(21) Appl. No.: 09/591,995

(22) Filed: Jun. 12, 2000

(30) Foreign Application Priority Data

Jun. 14, 1999 (EP) .................................. 99111521

(51) Int. Cl.
*H04L 7/00* (2006.01)

(52) U.S. Cl. ...................... 375/368; 375/316; 714/752
(58) Field of Classification Search ................ 375/362, 375/365, 366, 368, 356, 358, 354, 377, 357, 375/240.15, 240.28, 360, 316; 714/752
See application file for complete search history.

(56) References Cited

U.S. PATENT DOCUMENTS

| | | | | |
|---|---|---|---|---|
| 5,311,546 A | * | 5/1994 | Paik et al. .................. | 375/232 |
| 5,363,408 A | * | 11/1994 | Paik et al. .................. | 375/261 |
| 5,671,260 A | * | 9/1997 | Yamauchi et al. .......... | 375/372 |
| 5,771,239 A | | 6/1998 | Maroney et al. ............ | 370/474 |
| 5,920,572 A | * | 7/1999 | Washington et al. ........ | 370/535 |
| 6,154,642 A | * | 11/2000 | Dumont et al. ............. | 455/403 |
| 6,298,387 B1 | * | 10/2001 | Prasad et al. ............... | 709/236 |
| 6,373,861 B1 | * | 4/2002 | Lee ............................. | 370/503 |
| 6,493,409 B1 | * | 12/2002 | Lin et al. .................... | 375/375 |
| 6,535,566 B1 | * | 3/2003 | Tamamura et al. .......... | 375/371 |
| 6,678,317 B1 | * | 1/2004 | Murakami et al. .......... | 375/232 |
| 6,816,560 B1 | * | 11/2004 | Spalink ...................... | 375/368 |
| 2003/0058967 A1 | * | 3/2003 | Lin et al. .................... | 375/327 |

FOREIGN PATENT DOCUMENTS

WO  WO 95 15645  6/1995

OTHER PUBLICATIONS

Liu et al., Simulation and Implemenattion of US QAM-Based HDTV Channel Decoder, IEEE Transactions on Consumer Electronics, Aug. 1993, pp. 676-682.*

Lim H et al: "Low-Complexity Receiver Algorithms for the Grand-Alliance VSB HDTV System" IEEE Transactions on Consumer Electronics, US, IEEE Inc. New York, vol. 42, No. 3, p. 640-650, XP000616767.

Morello A: "A Flexible Bit-Rate Transmission System for Digital HDTV Outside Broadcasting by Satellite" Proceedings of the Global Telecommunications Conference, US, New York, IEEE, Nov. 29, 1993, p. 1622-1627, XP000436087.

Bretl W et al: "VSB Modem Subsystem Design for Grand Alliance Digital Television Receivers" International Conference on Consumer Electronics-Digest of Technicalpapers, US, New York, IEEE, vol. Conf. 14, p. 312-313, XP000547836.

* cited by examiner

*Primary Examiner*—Temesghen Ghebretinsae
(74) *Attorney, Agent, or Firm*—Oblon, Spivak, McClelland, Maier & Neustadt, P.C.

(57) ABSTRACT

A channel decoder for a digital broadcast receiver having a synchronization byte detector for detecting synchronization bytes in a decoded transmission signal. The synchronization byte detector provides a synchronization signal indicating a start of frame for transport stream packets in the decoded transmission signal and provides a lock detected output signal indicating the lock-in of the receiver to one broadcast channel. The lock detected output signal is used as at least one of a feed forward signal and a feed back signal to switch processing stages at least one of succeeding and preceding, respectively, said synchronization byte detector into a different mode dependent on whether or not a lock has been achieved.

5 Claims, 3 Drawing Sheets

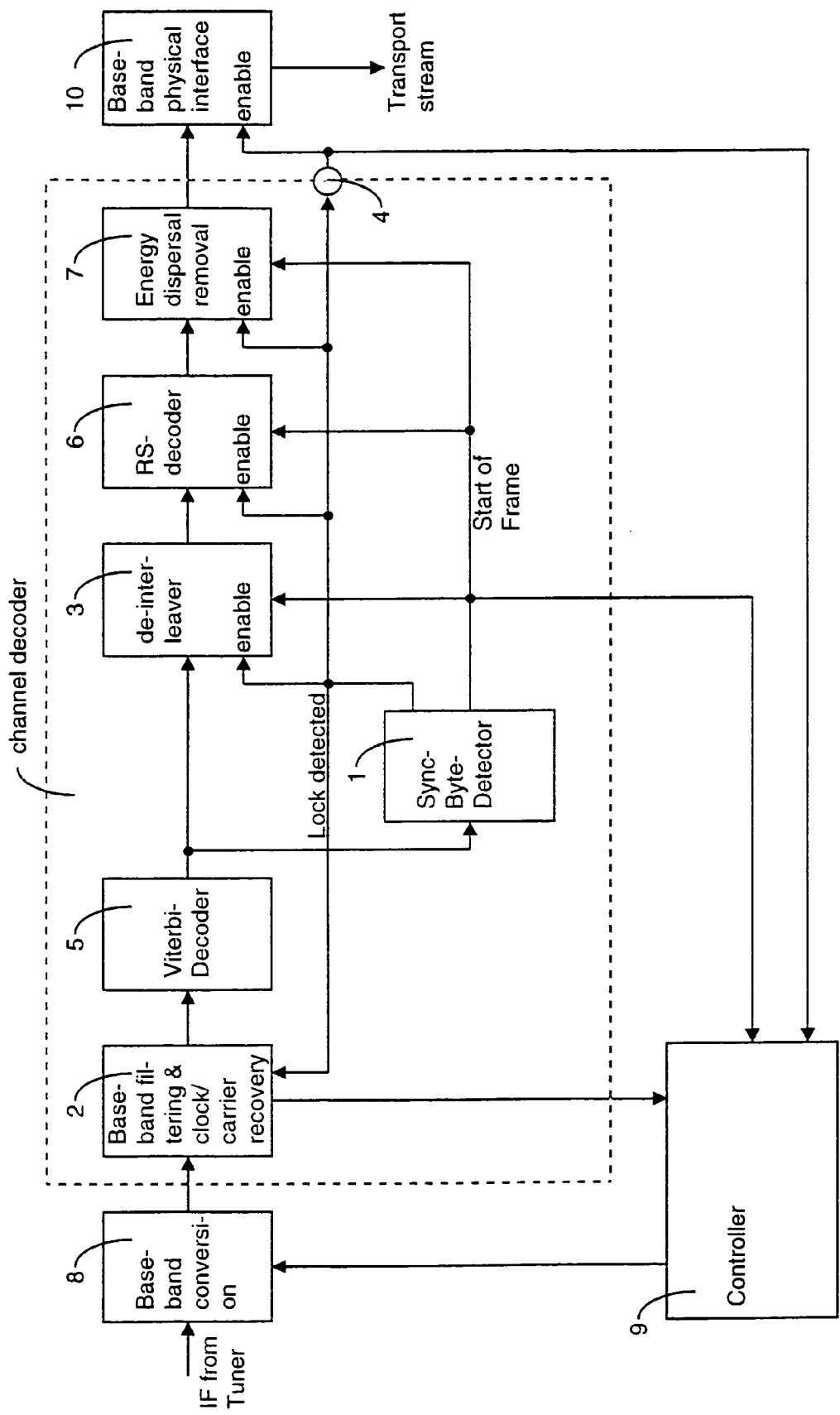

CHANNEL DECODER FOR A DIGITAL BROADCAST RECEIVER

The present invention relates to a channel decoder for a digital broadcast receiver, in particular to the use of the packet synchronization status available within such a channel decoder, i.e. within the synchronization byte detector included in such a channel decoder. In this sense the packet synchronization status indicates the lock-in of the receiver to one broadcast channel.

The typical hardware structure of a channel decoder within a digital video broadcast receiver adapted to the satellite reception is shown in FIG. 3. The IF-signal generated by the tuner of the digital broadcast receiver is supplied to a baseband conversion circuit 8 that receives at a second input thereof a control signal supplied by a control circuit 9. The demodulated signal is then supplied to the channel decoder before it passes a baseband physical interface 10 that outputs a transport stream of data.

In the shown example of satellite reception, the channel decoder includes as a first stage a baseband filtering & clock/carrier recovery circuit 2 which supplies a feedback signal to the control circuit 9. The baseband filtering & clock/carrier recovery circuit 2 includes a not shown clock and carrier recovery loop comprising clock/carrier phase detectors which is usually built by a PLL circuit to gain the clock and carrier of the transmitted signal. The resulting demodulated and baseband filtered IF-signal gets decoded in a Viterbi-decoder 5 which outputs a bitstream of the decoded bits of the transmission signal. This bitstream undergoes an error correction by a forward error correction (FEC) which is built by a de-interleaver 3 followed by a Reed-Solomon decoder 6 and an energy dispersal removal circuit 7 before being output to the baseband physical interface 10.

The de-interleaver 3, the RS-decoder 6 and the energy dispersal removal circuit 7 need synchronization signals that indicate transport stream packets as well as an 8-packet-structure for the energy dispersal removal. The synchronization signals are generated by a sync-byte-detector 1 which detects the regular repeated transmission of the synchronization byte (0×47 in the MPEG transport packet structure) or it is inverted (0×b8 in the MPEG transport packet structure) every 1632 bits (204 bytes).

Depending whether such a receiver is used for transmission signals transmitted via satellite, via cable or via a terrestrial broadcasting an additional signal processing might be necessary within the processing stages of the receiver described above. The basic differences of channel decoders adapted to the different kinds of broadcasting are described hereinafter in connection with an embodiment according to the present invention.

Also, the channel decoder of DAB receiver is in its main parts identical to the channel decoder described above and shown in FIG. 3, i.e. it also comprises a clock/carrier recovery circuit, a sync-byte-detector and a FEC-stage.

It is the object underlying the present invention to provide an improved channel decoder for a digital broadcast receiver.

This object is solved with a channel decoder for a digital broadcast receiver according to the present invention which comprises a synchronization byte detector 1 and which is characterized in that said synchronization byte detector 1 provides an output signal indicating the lock-in of the receiver to one broadcast channel which is used as a feed forward and/or feedback signal to respectively switch processing stages succeeding and/or preceding said synchronization byte detector 1 into a different mode dependent on whether or not lock has been achieved.

The use of the lock detected signal not only for purposes within the sync-byte-detector, but also to provide it within the whole channel decoder or even provide it to the whole broadcast receiver to switch processing stages into different modes, e.g. to switch-off all stages following the synchronization byte detector in the signal flow in case of an unlocked state, leads to less power consumption of the receiver and to less CPU resources needed within the receiver, since the dynamic assignment of CPU recources dependent on the synchronization status becomes possible.

According to the prior art the error correction stage operates in worst case condition if an incoming packet is not correctable, i.e. if the receiver is in un-locked state, and therewith exhibits a high power consumption and needs a high amount of CPU resources. Therefore, especially the switching of processing stages preceding and succeeding the synchronization byte detector dependent on whether or not lock has been achieved according to the present invention enables the shifting of processing power from the error correction stages succeeding the synchronization byte detector to the clock and/or carrier recovery during acquisition of a broadcast channel and vice versa if the receiver is properly locked to a broadcast channel. With this measure processing power is saved during acquisition of a broadcast channel, since the forward error correction and preferably all further following processing stages get switched-off in case the receiver is not locked to a certain broadcast channel.

Furtheron, if the loop bandwidth of the clock and carrier recovery loop built within the baseband filtering & clock/carrier recovery circuit gets switched dependent on whether or not lock has been achieved the baseband filtering & clock/carrier recovery circuit needs less calculation power after the receiver is locked, since only a narrow bandwidth has to be processed in this case.

It is also possible to switch the loop bandwidth of other loops preceding the sync-byte detector 1, e.g. of a loop that adjusts the tuning frequency of the receiver.

For these reasons, the present invention inherits the advantage that a smaller CPU can be built into a digital broadcast receiver which comprises a channel decoder according to the present invention, since after the lock-in to a broadcast channel the spare processing power of the baseband filtering & clock/carrier recovery circuit and/or any other circuit that is preceding the sync-byte-detector can be shifted to the forward error correction stage and the processing stages following thereafter. Vice versa, if the broadcast receiver adapted according to the present invention is not locked to a broadcast channel a high processing power can be assigned to the baseband filtering & clock/carrier recovery circuit and/or any other circuit that is preceding the sync-byte-detector, since the forward error correction stage and the processing stages following thereafter need no processing power at all.

Still furtheron, the digital broadcast receiver according to the present invention achieves a better reconstruction of the transmitted data, since the clock and/or carrier phase detectors used within the baseband filtering & clock/carrier recovery circuit can be switched to implementations that work only in locked mode, but in this case better than the robust implementations used for acquisition, dependent on the synchronization status of the channel decoder, i.e. the sync-byte-detector. Such a switching is also thinkable for other circuits within the broadcast receiver.

The present invention is in particular applicable to digital video broadcast receivers and in particular to such for cable transmission, but it can also be used for satellite or terrestrial transmission and/or for digital audio broadcast reception according to any transmission standard. Basically, it can be implemented in any channel decoder.

BRIEF DESCRIPTION OF THE SEVERAL VIEWS OF THE DRAWINGS

An exemplary embodiment of the present invention will be described in connection with the accompanying figures in which FIG. 1 shows a block diagram of a channel decoder according to a preferred embodiment of the present invention;

DETAILED DESCRIPTION OF THE INVENTION

Figure 2A:
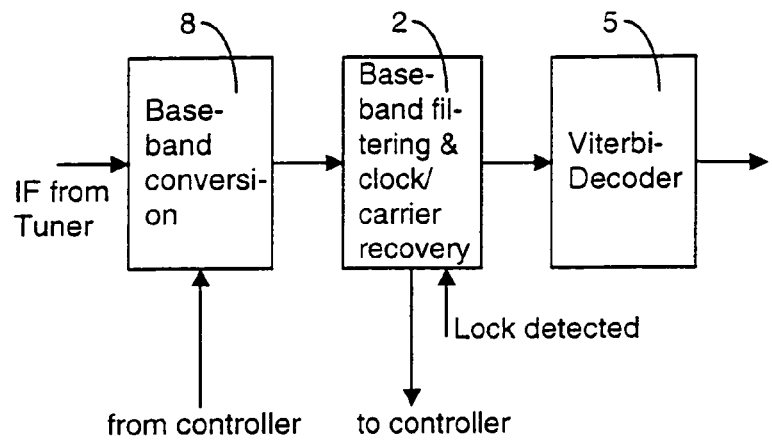
FIG. 2 shows the basic differences inbetween receivers for the satellite, the cable and the terrestrial broadcast system.

From a signal flow point of view the channel decoder according to the present invention shown in FIG. 1 basically works in the same way as the channel decoder described in connection with FIG. 3. According to the present invention the sync-byte-detector 1 included within the channel decoder according to the present invention additionally generates a lock detected output signal which indicates the lock-in to a specific broadcast channel. This lock detected output signal is supplied to at least one of the clock/carrier recovery circuit 2, the de-interleaver 3, the RS-decoder 6, the energy dispersal removal circuit 7 and an additional output port 4 of the channel decoder.

As described above, on basis of the lock-detected output signal of the sync-byte-detector 1 the clock/carrier recovery circuit 2 is able to switch the loop bandwidth of its clock and/or carrier recovery loop and/or to switch the clock carrier phase detectors to implementations that work only in locked mode, but in this case better than the robust implementation used for acquisition.

Furtheron, the de-interleaver 3, the Reed-Solomon-decoder 6 and the energy dispersal removal circuit 7 receive the lock detected output signal of the sync-byte-detector 1 at a respective enable input so that they can be switched-on if lock has been achieved and switched-off in unlocked state.

Furtheron, the lock detected output signal of the sync-byte-detector 1 is supplied to an additional output port 4 of the channel decoder so that also other processing stages within the digital broadcast receiver can be switched into different modes for an improved power consumption and/or processing power consumption of the whole digital broadcast receiver like it is performed within the channel decoder according to the present invention.

FIG. 1 shows that the lock detected output signal is also supplied to an enable input of the baseband physical interface 10 that is arranged succeeding the channel decoder according to the present invention. Therefore, also this baseband physical interface 10 gets switched-on if lock has been achieved and switched-off in unlocked state. Furtheron, also the controller 9 receives the lock detected output signal via the output port 4 so that all processing stages within the receiver that are connected to the controller 9 might be included in the dynamic assignment of processing power. In the shown example the baseband conversion circuit 8 receives a control signal from the controller 9 and therefore a loop which is build by the baseband filtering & clock/carrier recovery circuit 2, the controller 9 and the baseband conversion circuit 8 to properly adjust the baseband conversion can e.g. be switched in view of its band-width and/or adjusting strategies.

Figure 2B:
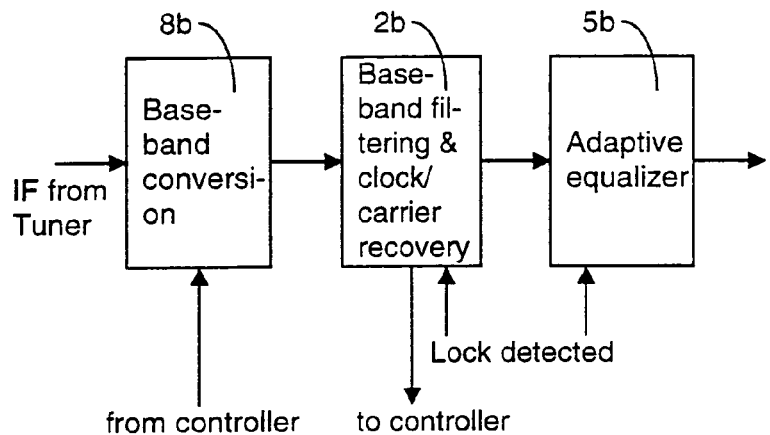
Figure 2C:
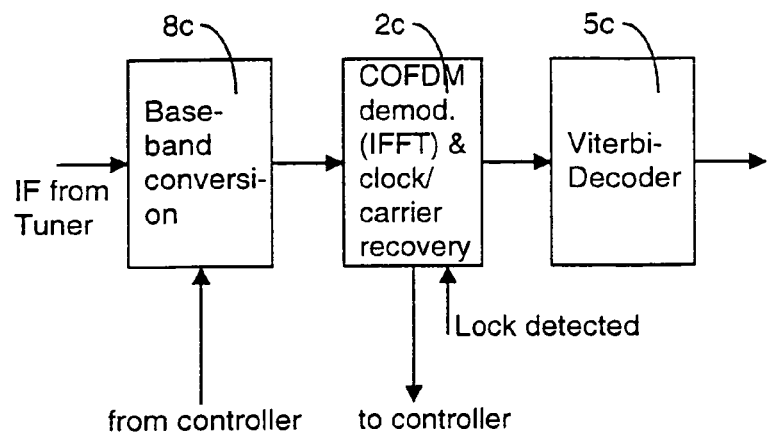
Figure 3:
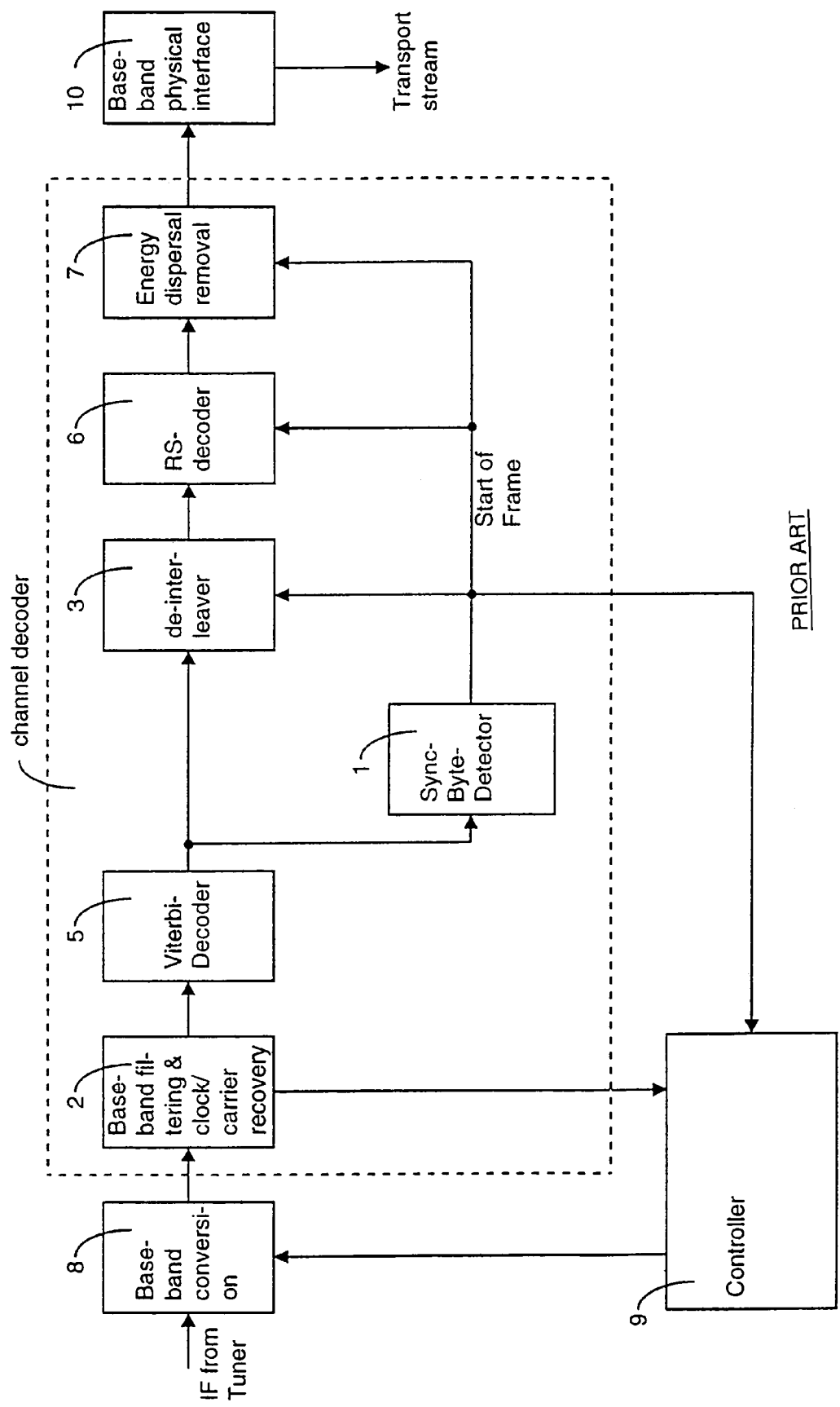
FIG. 3 shows a block diagram of the signal processing within a digital video broadcast receiver according to the prior art, in particular within its channel decoder.

FIG. 2 shows that a "digital demodulator" which comprises a baseband conversion stage 8, a baseband filtering & clock/carrier recovery circuit 2 and a Viterbi-Decoder 5 in case of satellite reception, as shown in FIGS. 1, 3 and 2a, comprises a baseband conversion stage 8b, a baseband filtering & clock/carrier circuit 8b and an adaptive equalizer 5b in case of cable reception as it is shown in FIG. 2b and that it comprises a baseband conversion stage 8c, a COFDM demodulator & clock/carrier recovery circuit 2c and a Viterbi-decoder 5c in case of terrestrial reception as it is shown in FIG. 2c. The COFDM demodulator performs an IFFT, i.e. an inverse fast Fourier transformation.

In the shown examples the processing stages corresponding to those shown and described in connection with FIG. 1 get switched in the same or an equal manner on basis of the lock detected output signal supplied by the sync-byte-detector.

The adaptive equalizer 5b shown in FIG. 2b also receives the lock detected output signal to change its adaptation strategy dependet therefrom from an aquisition mode to a tracking mode in case of lock-in of the receiver and vice-versa in case the receiver is not locked-in. Of course, this changing of the adaptation strategy is not limited to adaptive equalizers within channel decoders used in case of cable reception.

The channel decoder of the typical digital audio receiver locks basically as the one shown in FIGS. 1 and 3 in connection with the "digital demodulator" shown in FIG. 2c and can of course also be replaced by a channel decoder according to the present invention which uses a lock detected signal output by its synchronization-byte-detector to dynamically assign processing power to different processing units within the channel decoder and/or also the rest of the digital audio broadcast receiver.

From the above description it is clear that the invention is not limited to just disable/enable the error correction, to switch the loop bandwidth of the clock and carrier recovery loop and/or to switch the clock carrier phase detectors to implementations that work only in locked mode, but in this case better than the robust implementations used for acquisition, but that the present invention discloses the use of the packet synchronization status, namely a lock detected signal supplied by the synchronization byte detector 1 to assign the amount of processing power within a digital broadcast receiver.

What is claimed is:

1. A channel decoder for a digital broadcast receiver, comprising:
   a synchronization byte detector for detecting synchronization bytes in a decoded transmission signal;
   wherein said synchronization byte detector provides a synchronization signal indicating a start of frame for transport stream packets in the decoded transmission signal;
   wherein the synchronization byte detector provides a lock detected output signal indicating the receiver is locked-in to one broadcast channel;
   said lock detected output signal being used as at least one of a feed forward signal and a feed back signal to switch processing stages at least one of succeeding and preceding, respectively, said synchronization byte detector into a different mode dependent on whether or not a lock has been achieved; and wherein at least one of a clock and a carrier recovery circuit preceding the synchronization byte detector is switched from a robust mode used for acquisition of a broadcast channel to a locked mode used for compensation of small deviations of an acquired broadcast channel when the receiver is locked-in and vice-versa when the receiver is not locked-in.

2. A channel decoder for a digital broadcast receiver, comprising:

a synchronization byte detector for detecting synchronization bytes in a decoded transmission signal;

wherein said synchronization byte detector provides a synchronization signal indicating a start of frame for transport stream packets in the decoded transmission signal;

wherein the synchronization byte detector provides a lock detected output signal indicating the receiver is locked-in to one broadcast channel;

said lock detected output signal being used as at least one of a feed forward signal and a feed back signal to switch processing stages at least one of succeeding and preceding, respectively, said synchronization byte detector into a different mode dependent on whether or not a lock has been achieved; and wherein a loop bandwidth of at least one of a clock and a carrier recovery loop within the clock and carrier recovery circuit is switched from a wide bandwidth mode that allows a fast coarse lock of the receiver to the clock and a carrier of a transmission signal to a narrow bandwidth mode, respectively, which performs a low noise fine adjustment of the receiver to the clock and the carrier of the transmission signal, respectively, when the receiver is locked-in and vice-versa when the receiver is not locked-in.

3. A channel decoder for a digital broadcast receiver, comprising:

a synchronization byte detector for detecting synchronization bytes in a decoded transmission signal;

wherein said synchronization byte detector provides a synchronization signal indicating a start of frame for transport stream packets in the decoded transmission signal;

wherein the synchronization byte detector provides a lock detected output signal indicating the receiver is locked-in to one broadcast channel;

said lock detected output signal being used as at least one of a feed forward signal and a feed back signal to switch processing stages at least one of succeeding and preceding, respectively, said synchronization byte detector into a different mode dependent on whether or not a lock has been achieved; and wherein an adaptive equalizer within the channel decoder is switched from an acquisition mode to a tracking mode when the receiver is locked-in and vice-versa when the receiver is not locked-in.

4. A channel decoder for a digital broadcast receiver, comprising:

a synchronization byte detector for detecting synchronization bytes in a decoded transmission signal;

wherein said synchronization byte detector provides a synchronization signal indicating a start of frame for transport stream packets in the decoded transmission signal;

wherein the synchronization byte detector provides a lock detected output signal indicating the receiver is locked-in to one broadcast channel;

said lock detected output signal being used as at least one of a feed forward signal and a feed back signal to switch processing stages at least one of succeeding and preceding, respectively, said synchronization byte detector into a different mode dependent on whether or not a lock has been achieved; and a forward error correction stage succeeding the synchronization byte detector; said forward error correction stage being switched from an off mode to an on mode when the lock detected output signal indicates the receiver is locked-in; and said forward error correction stage being switched from the on mode to the off mode when the lock detected output signal indicates the receiver is not locked-in.

5. The channel decoder according to claim 4, wherein all stages succeeding the forward error correction stage are switched from an off mode to an on mode when the receiver is locked-in and vice-versa when the receiver is not locked-in.

* * * * *